Figure 1:
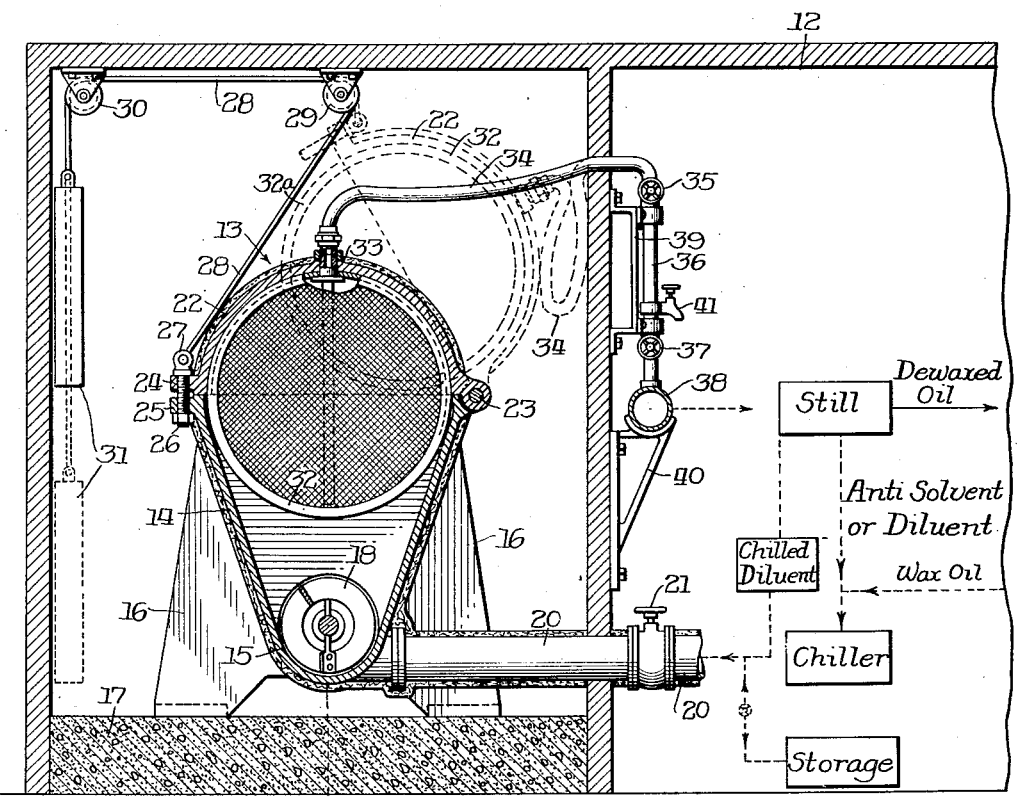

Feb. 20, 1934.  C. E. ADAMS  1,948,018
OIL-WAX SEPARATION SYSTEM
Filed Jan. 28, 1931

Inventor:
Chester E. Adams.
By Bruce K. Brown  atty

Patented Feb. 20, 1934

1,948,018

UNITED STATES PATENT OFFICE 1,948,018

OIL-WAX SEPARATION SYSTEM

Chester E. Adams, Hammond, Ind., assignor to Standard Oil Company, Chicago, Ill., a corporation of Indiana Application January 28, 1931. Serial No. 511,799

1 Claim. (Cl. 210—182)

This invention relates to a system for dewaxing lubricating oils and it relates more particularly to a system wherein a volatile antisolvent is employed for the production of low cold test oils.

The object of my invention is to provide a filter structure which can be operated by remote control and which can be easily cleaned or repaired. A further object is to avoid the nuisance of escaping gases, to simplify operation, and to reduce the losses of antisolvent material. A further object is to provide an improved filter of the pressure type wherein the filter leaves are readily accessible from above so that the lower part of the filter may remain closed and sealed. A further object is to effectively insulate a filter of this type so that it may be operated at low temperatures. Other objects will be apparent from the following description.

In practicing my invention I provide a filter with a pivoted top which encloses a plurality of filter leaves, each leaf communicating through a separate connection and an indicator to a filtrate discharge manifold. By means of this structure the leaves are readily accessible and they can be easily cleaned or repaired. The filter is designed to operate for long periods without being opened, and to further avoid danger or nuisance therefrom, I prefer to keep the filter in a closed chamber and to operate it by remote control. The air in the closed chamber is kept cold so that this chamber helps to keep the filter at a constant low temperature. The filter is preferably operated by remote control, each filter leaf being connected through an indicator glass to a common filtrate receiver. I have illustrated a preferred embodiment of my invention in the accompanying drawing wherein similar parts are designated by like reference characters in the several views and wherein—

Figure 2:
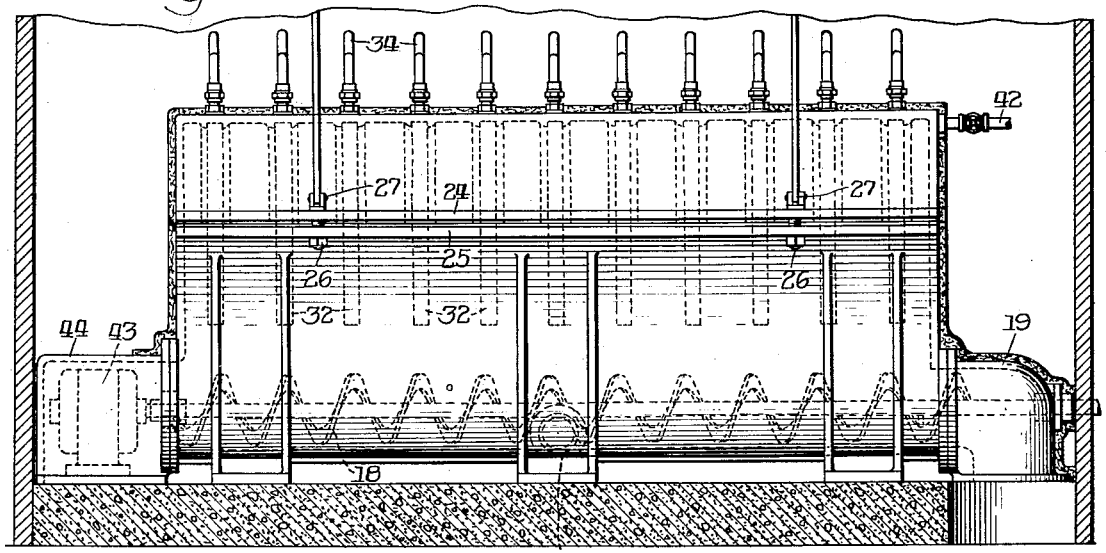

Figure 1 is an end elevation of my improved structure, parts of the system being connected diagrammatically, and Figure 2 is a front elevation of my improved filter.

In the fractionation of petroleum the viscous, or lubricating, oils usually contain paraffin, petrolatum and/or slop wax. At low temperatures the wax solidifies and prevents the flow of the oil, and various methods have therefore been devised to separate the wax from the oil so that a "low cold test" oil may be produced. One of these methods is to dilute the oil with a light diluent and/or antisolvent, such as acetone, methyl formate, methyl carbonate, ethyl carbonate, etc. and/or mixtures of these antisolvents with naphtha and/or naphtha and benzol. The antisolvent tends to throw the wax out of the solution so that it may be more readily separated from the oil. The antisolvents are usually expensive, volatile, inflammable and sometimes poisonous so that it is extremely important that a dewaxing system be designed to prevent their escape.

I provide a gas tight filter enclosed in a substantially gas tight insulated room 10. Conduits leading to and from the filter extend through wall 11 to a remote control in room 12. During the normal operation of the filter the door of room 10 is kept closed and the air in this room is maintained at a constant low temperature, preferably below 0° F.

The filter 13 is of the pressure type which consists of a fixed chamber having inclined side walls 14 leading to a cylindrical discharge trough 15. The chamber is supported by suitable flanges 16 mounted on a concrete base 17. An auger or screw conveyer 18 is suitably journaled to rotate in trough 15 and to discharge the filter cake therefrom through pipe 19. The oil-wax mixture is admitted to the chamber through pipe 20 in amounts regulated by valve 21.

The cover or top 22 of the filter is pivoted at 23 so that its front end may be swung upwardly to provide access to the filter leaves. It is secured in closed position by means of abutting flanges 24 and 25, which are held together by a suitable clamp 26 which is pivoted to the filter top at 27. To facilitate the opening and closing of this cover I provide suitable cables 28 trained over pulleys 29 and 30, and carrying at their other ends suitable weights 31 which substantially counterbalance the top in its lowered position. It is understood, however, that the counterbalance weights are illustrative of any suitable means which might be used to open and close the heavy filter top.

Filter leaves 32 are provided at spaced intervals and are fixed to the removable top so that when the top is rotated to its upper position, these leaves are exposed for cleaning or repair. Each of the filter leaves contains a flattened conduit which leads from the bottom of the leaf to a circular threaded outlet 33. This outlet is coupled to a flexible conduit 34 which leads to valve 35, sight glass 36, valve 37, and distillate main 38. The sight glass tubes are mounted on a suitable bracket 39 and the distillate main is supported on a suitable bracket 40. A sample cock 41 is provided above valve 37 so that oil may be withdrawn for test purposes.

Instead of using flexible couplings I may secure the filter leaves by leading the outlets 33 through the front or back inclined wall 14 and clamping them thereto instead of to cover 22. In either case a separate indicator glass will be connected to each filter leaf so that the performance of the filter can be easily regulated.

When a sufficient cake has been built up on the filter leaves liquid is withdrawn from the system to a suction storage tank, valve 21 is closed and gas blown through suitable inlet 42 to disengage the filter cake from the filter leaf. The filter cake falls into the discharge trough and the motor 43 in casing 44 turns the screw conveyor 18 to discharge the cake through pipe 19.

The filtrate from pipe 38 is conveyed to a suitable still where the diluent and/or antisolvent is distilled therefrom, condensed and pumped back to the chiller tank with incoming wax-bearing oil. At intervals it is necessary to add a slight amount of the make-up antisolvent and/or diluent at this point. The mixture of separated wax crystals and oil is introduced by pipe 20 to the filter chamber, the oil passing through the leaves and the wax collecting in a cake thereon. If the distillate appears cloudy in one of the sight glasses, the corresponding valve 37 may be closed, the leaf may be repaired and liquid may be withdrawn from petcock 41 until it runs clear. When a cake of sufficient thickness has been built up on the leaves, the liquid in the chamber is withdrawn to the chiller or to the storage chamber by the introduction of suitable gas through pipe 42. This gas is then passed through the filter cakes to drive the oil therethrough, and to force said oil through the flexible couplings into the discharge manifold 38. Finally the gas pressure is released in conduit 42 and is applied through manifold 38 for blowing the cakes from the filter leaves. The cakes are withdrawn from the filter by means of the screw conveyor and the operation is repeated continuously until the filter leaves become clogged or impaired.

It should be understood that a washing step may be used if needed. In this case, chilled antisolvent, naphtha, and/or benzol is admitted to the filter after the original slurry has been forced out and before the cake is dried. Also the filter cloth may be washed after the cake is removed. It is important that the refrigerated mixture of oil, diluent, antisolvent and wax be carefully handled because if the wax crystals are finely disseminated they may clog the filter. Best results are obtained by using fluid pressure to force the slurry into the filter and to force the filtrate through the leaves.

When it is necessary to clean or repair the filter leaf the brackets 26 are loosened and the top is swung up. By means of the flexible coupling and the mounting of the filter leaves I have provided a structure which is readily accessible, easy to operate, and highly efficient. I have provided a pressure filter with separate discharges from each of the leaves so that it can be operated by remote control.

While I have described in detail a preferred embodiment of my invention it is understood that I do not limit myself to any details except as defined by the following claim. Furthermore, it will be understood that suitable insulation will be applied to the filter, pipes, etc. and that suitable valves and fixtures will be provided in accordance with engineering practice. The insulation on the filter press may be eliminated if the room 10 is properly insulated but I prefer to place insulation around both.

I claim:

A pressure filter system for the separation of solidified wax from diluted oil at low temperatures, which comprises an insulated, closed, gastight filter casing, an insulated closed housing in which said filter is disposed, a closed conduit connected with the base of said casing for removing wax slurry therefrom whereby the filter cake can be removed without opening the filter, a plurality of individual filter leaves within said casing, means for removing said filter leaves from the top of said casing so that the closed filter cake discharge means will not be disturbed, a conduit for introducing the slurry to be filtered at the base of said filter casing, means for conducting filtrate separately from each leaf, sight glasses in said filtrate conducting means which are visible from outside of said housing, means located outside of said housing for stopping the filtrate flow when said filtrate appears cloudy in the sight glass, and remote control means for regulating the pressure in said filter, regulating the filtrate discharge, and regulating the filter cake discharge located outside of said housing whereby the filter may operate for a long period of time by remote control without the necessity of said housing being opened.

CHESTER E. ADAMS.